Nov. 28, 1933.  A. BIENENSTEIN  1,937,107
TWISTING FILLER FOUNTAIN PEN
Filed May 22, 1933
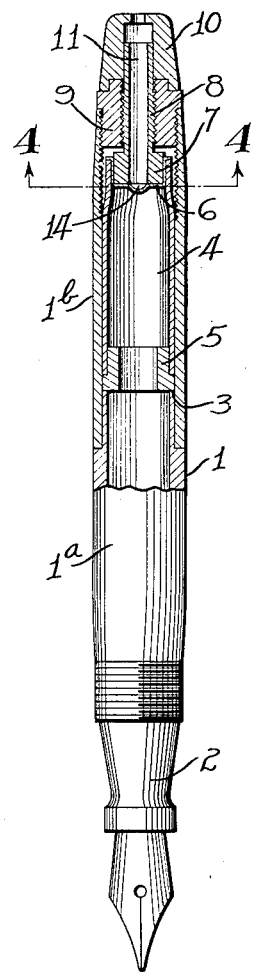
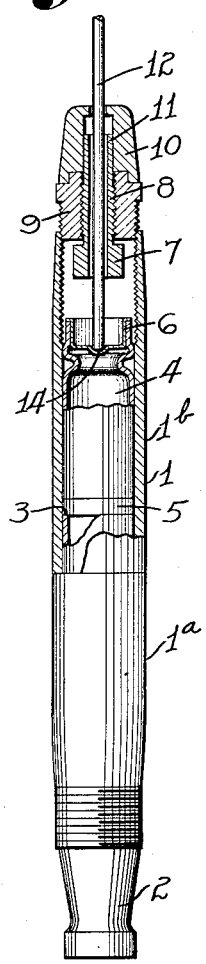
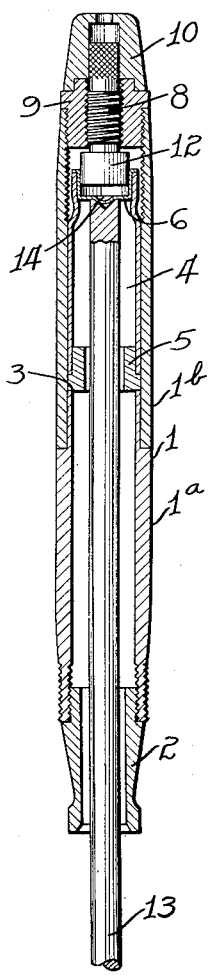
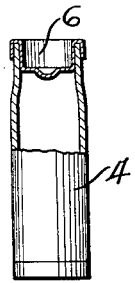
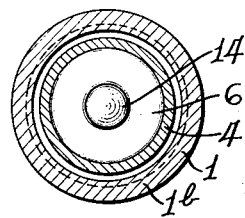
Inventor
Andreas Bienenstein
By Owen & Owen,
Attorneys Patented Nov. 28, 1933

1,937,107

UNITED STATES PATENT OFFICE 1,937,107

TWISTING FILLER FOUNTAIN PEN

Andreas Bienenstein, Toledo, Ohio, assignor to The Conklin Pen Company, Toledo, Ohio, a corporation of Ohio Application May 22, 1933. Serial No. 672,251

7 Claims. (Cl. 120—46)

This invention relates to fountain pens, and has primarily for its object to improve on those of the twisting filler type.

The invention is fully described in the following specification, and one embodiment thereof illustrated in the accompanying drawing, in which—

Figure 1 is an enlarged elevation of a fountain pen partially in central longitudinal section with the filler parts in normal position. Fig. 2 is a similar view with the filler control in the act of being screwed into position in the pen barrel and with the engaging end of the twisting filler held out of engaging relation to the control stem during such action. Fig. 3 is a central longitudinal section of the barrel and filler parts with portions in full, with the filler control in assembled position and showing the twisting filler member in the act of being engaged with the control stem by insertion of a rod through the filling end of the pen barrel, Fig. 4 is an enlarged cross-section taken on the line 4—4 in Fig. 1, and Fig. 5 is a modification of the tube and cup connection.

Referring to the drawing, 1 designates the pen barrel having the customary pen and feed-bar carrying nipple 2 at its forward or inlet end, and through which nipple ink may be introduced into the barrel, and having its rear end closed and provided with the twisting filler means embodying the invention, as hereinafter described.

The barrel 1 is preferably made in two sections comprising a forward section 1ª and a rear section 1ᵇ, which sections are of tubular form, and connected and hermetically sealed at their inner ends by telescoping for a distance one on the other. In the present instance, the section 1ª has its wall, particularly at its rear end portion, thickened relative to the wall of the section 1ᵇ, and the outer surface of such thickened portion annularly reduced for a distance from the inner end of the forward section to permit the inner end of the rear section to telescope thereover. At the same time the inner end of the forward section provides a shoulder 3 internally of the forward end portion of the section 1ᵇ for the purpose hereinafter described. The making of the barrel in two sections also has the added advantage that the forward section may be composed of transparent or translucent material, so that the ink contained therein can be viewed through the wall of such sections and the rear section may be made from a material of an opaque nature, so that the filler parts enclosed therein may not be observed.

The filler means embodying the primary feature of the present invention comprises a twister member 4 of tubular form and composed of a suitable liquid proof pliant material, such, for instance, as rubber, and having its forward end closed by a nipple 5 and its rear end closed by a cup member 6. The nipple 5 has a reduced portion telescoped within the forward end of the tube or filler member 4 and has its outer end annularly flanged to snugly fit the bore of the barrel 1, and particularly in the present instance the bore of the rear barrel section 1ᵇ, so that the nipple and connected end portion of the filler tube are anchored to the barrel preferably by frictional coaction therewith. The shoulder 3 acts as a stop for coaction with the nipple 5 when forced into the barrel, and thus facilitates a proper positioning of the forward end portion of the filler tube in the barrel during assembling.

The cup member 6 at the rear end of the filler tube 4 is preferably formed of sheet metal with its side wall of cylindrical form and radially flanged at its outer edge to serve as a stop for coaction with the end of the tube 4 when the cup member is inserted therein. This member serves as a plug for closing the rear end of the filler tube 4 and has its cup or cavity opening rearwardly to receive and have pressed or close frictional engagement with the cylindrical headed end 7 of a control stem 8. If desired, the flanged end of the cup 6 may be turned back in parallel relation to the cup wall and employed to clamp the tube end to the cup, as shown in Fig. 5.

The control stem 8 is threaded through an axial opening provided in a plug or closure member 9 for the rear barrel end, such member in the present instance being threaded entirely through the plug and having a stop shoulder for coaction with the plug end to limit the extent of movement therein. A control knob 10 is fixed on the outer end of the stem 8 without the plug 9 and is adapted to have stop coaction with the plug end when the stem 8 is turned home. When the knob 10 is turned to the left, or in a direction to move the stem outwardly, the engagement of the stem head 7 with the filler tube 4 causes a twisting of the tube to expel at least a portion of the air therefrom, the extent of twisting being limited by the shouldered coaction of the stem head 7 with the plug. It is apparent that upon a reverse or untwisting movement of the stem, the atmospheric pressure will cause ink, in which the inlet end of the barrel may be submerged during such action, to be forced into the barrel, as is well understood in the art. The plug 9 and knob 10 have interengaging cylindrical portions at their adjacent ends to provide a bearing connection therebetween so that the stem 8 in the plug 9 is relieved of such function. This prevents relative lateral movement of the plug and knob even though the stem should be loose in the plug.

During an assembly of the parts, the plug 9, with the control stem attached, is threaded into the barrel, and in order to prevent the headed end of the stem from frictionally engaging the cup member 6 and causing a turning and consequent twisting of the filler tube 4 therewith, the knob 10 and its stem are provided with an axial opening 11 to permit a piece of wire 12 to be inserted therethrough and to centrally engage the bottom of the cup member 6 and press it out of engagement with the stem head 7 during the turning of the plug 9 into the barrel. This having been accomplished, the wire 12 is removed and a rod-like member 13 then inserted into the barrel through the inlet end thereof and through the filler tube nipple 5 with its inner end bearing against the inner end of the cup member 6, so that upon an application of sufficient inward pressure on the rod 13, the cup member is forced over the stem head 7 into frictional engagement therewith. To facilitate centering the wire 12 with the cup member 6, when pressure is applied from one to the other, the bottom of the cup member is provided with a central wire receiving depression 14. This tends to prevent the engaging end of the wire 12 from slipping to one side or the other of the cup center when pressure is applied, and a consequent tilting and locking of the cup member in a depressed position in the barrel.

It is apparent that I have provided a simple means for connecting the control stem and twisting filler member and for facilitating an assembling of the parts.

I wish it understood that my invention is not limited to any specific arrangement or form of the parts, and that it is capable of numerous modifications and changes without departing from the spirit of the claims.

Having thus described my invention, what I claim as new, and desire to secure by United States Letters Patent, is:

1. In a pen of the class described, a barrel, a twisting filler member disposed in the barrel and having its forward end anchored therein and open to the forward end of the barrel, a rotatable control for the filler member carried by the rear end of the barrel, one of said control and the rear end of said member having a cup portion and the other a stud portion in pressed fit engagement one with the other.

2. In a pen of the class described, a barrel, a twisting filler member disposed in the barrel and having its forward end anchored therein and open to the forward end of the barrel, a rotatable control member for the filler member mounted in the rear end portion of the barrel, said members having telescoping portions in pressed fit engagement and the control member having an opening therethrough for insertion of a tool to force the engaging ends of the members apart.

3. In a pen of the class described, a barrel open at both ends, a twisting filler member disposed in the barrel with its forward end anchored therein and open to the forward end of the barrel, said member having a stiff outwardly opening socket member at its rear end, a plug removably closing the rear end of the barrel without said filler member and having an axial opening therethrough, a stem threaded through said plug opening and having a control at its outer end, and a portion at its inner end releasably entering the socket portion of the filler member and having engagement therewith to effect a turning of one with the other.

4. In a pen of the class described, a barrel, a twisting filler member disposed in the barrel and having its forward end anchored therein and open to the forward end of the barrel and having its rear end closed and of a stiff nature, a closure member detachably connected to the rear end of the barrel and having an axial opening therethrough, a control stem threaded through said opening and adapted to have limited turning movements relative thereto, the inner end of said stem and the stiff rear end portion of said filler member having pressed-fit cup and stud engagement to cause a turning of one with the other and to permit such an engagement thereof after the assembly of the plug and stem with the barrel, said control stem having an axial opening therethrough for introducing a tool to exert pressure on the rear end of the filler member and hold it out of engagement with the stem during assembly of the plug stem and barrel, the rear end of the filler member having a depression for centering the engagement of the tool therewith.

5. In a pen of the class described, a barrel comprising front and rear telescoped sections, with the inner end of the front section forming a shoulder within the rear section, a twisting filler member disposed in the rear section and having its forward end open to the forward end of the barrel and provided with a stiff nipple portion which has pressed-fit engagement with the barrel and is in positioning stop engagement with said shoulder, the rear end of said filler member being closed, and means carried by the rear end of the barrel and operable to control the twisting movements of the twisting member.

6. In a pen of the class described, a barrel, a twisting filler means carried by the barrel, said means comprising a tube of twistable material having its forward end anchored in the barrel, and a cup member disposed in the rear end of the tube with its cup portion opening rearwardly and having a doubled back flange at its outer end serving to clamp the respective tube end to the cup wall, and a twisting control having a portion inter-engaging with said cup to effect a turning thereof when the control is turned.

7. In a pen of the class described, a twisting filler member disposed in the barrel and having its forward end anchored therein and open to the forward end of the barrel, a plug member mounted in the rear end of the barrel and having an axial opening therethrough, a stem threaded through said opening and having a part at its inner end in engagement with the rear end of the filler mmeber to effect a turning thereof when the stem is turned, means for limiting the outward turning movement of the stem, and a control knob on the outer end of the stem, said knob and plug having inter-engaging portions forming a lateral bearing for one on the other which is effective throughout the limit of axial movement of the stem.

ANDREAS BIENENSTEIN.